(12) United States Patent
Friske et al.

(10) Patent No.: US 12,103,884 B2
(45) Date of Patent: Oct. 1, 2024

(54) VACUUM CHUCK HAVING ELONGATE GROOVES AND METHOD OF COLD-FORMING CURVED GLASS ARTICLES USING SAME

(71) Applicant: CORNING INCORPORATED, Corning, NY (US)

(72) Inventors: Mark Stephen Friske, Campbell, NY (US); Peter Knowles, Elmira, NY (US); Christopher Mark Schweiger, Painted Post, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 525 days.

(21) Appl. No.: 17/201,605

(22) Filed: Mar. 15, 2021

(65) Prior Publication Data
US 2021/0292219 A1 Sep. 23, 2021

Related U.S. Application Data

(60) Provisional application No. 62/991,193, filed on Mar. 18, 2020.

(51) Int. Cl.
*C03B 23/035* (2006.01)
*B25B 11/00* (2006.01)

(52) U.S. Cl.
CPC ........ *C03B 23/0357* (2013.01); *B25B 11/005* (2013.01)

(58) Field of Classification Search
CPC ... C03B 23/0357; B25B 11/005; B23Q 3/088; B23Q 11/0046; H01L 21/6838; H01L 21/6875; B64F 5/10; B23B 2215/04
(Continued)

(56) References Cited

U.S. PATENT DOCUMENTS 6,032,997 A 3/2000 Elliott et al.
9,938,179 B2 * 4/2018 Immerman ......... C03B 23/0357
(Continued)

FOREIGN PATENT DOCUMENTS

CN 104395252 A 3/2015
CN 109822444 A 5/2019
(Continued)

OTHER PUBLICATIONS

Phenolic Resin Tables found at https://www.tophpl.com/The-Advantages-of-Phenolic-Resin-Tables-id6324586.html (Year: 2018).*
(Continued)

*Primary Examiner* — Laura C Guidotti
*Assistant Examiner* — Caleb Andrew Holizna
(74) *Attorney, Agent, or Firm* — William M. Johnson; Payal A. Patel (57) ABSTRACT

Disclosed are embodiments of a vacuum chuck. The vacuum chuck includes a forming surface having a first longitudinal end, a second longitudinal end, and a curved region. The first longitudinal end and the second longitudinal end define a longitudinal axis, and the curved region defines a radius of curvature along the longitudinal axis. A plurality of elongate grooves are formed into the forming surface in the curved region. Each elongate groove of the plurality of elongate grooves has a length, a width, and a depth extending into the forming surface. The length of each elongate groove is greater than the width. At least one conduit is configured for connection to a vacuum source and is disposed beneath the forming surface. The at least one conduit extends transversely across the plurality of elongate grooves, and the at least one conduit is in fluid communication with the plurality of elongate grooves.

17 Claims, 6 Drawing Sheets

(58) Field of Classification Search
USPC .......................................................... 269/21
See application file for complete search history.

(56) References Cited

U.S. PATENT DOCUMENTS

| | | | |
|---|---|---|---|
| 10,138,546 | B2 | 11/2018 | Boughton et al. |
| 2013/0323415 | A1* | 12/2013 | Brackley ................ B41M 5/007 427/171 |
| 2015/0217420 | A1* | 8/2015 | Mandler ............... B24B 13/005 269/21 |
| 2017/0121210 | A1 | 5/2017 | Rai et al. |
| 2017/0274626 | A1 | 9/2017 | Ukrainczyk et al. |
| 2018/0319144 | A1 | 11/2018 | Faik |
| 2019/0010603 | A1 | 1/2019 | Boughton et al. |
| 2019/0077262 | A1 | 3/2019 | Benjamin et al. |
| 2019/0344405 | A1* | 11/2019 | Mochizuki ............ B25B 11/005 |
| 2023/0409136 | A1 | 12/2023 | Boggs et al. |

FOREIGN PATENT DOCUMENTS

| | | | |
|---|---|---|---|
| CN | 110520293 | A | 11/2019 |
| CN | 217025764 | U | 7/2022 |
| EP | 2566658 | B1 | 1/2019 |
| JP | 2013-188993 | A | 9/2013 |
| KR | 10-1678986 | B1 | 11/2016 |
| WO | 2012/118612 | A1 | 9/2012 |
| WO | 2014/130331 | A1 | 8/2014 |
| WO | 2019/055652 | A1 | 3/2019 |

OTHER PUBLICATIONS

European Patent Application No. 21162039.8, Extended European Search Report dated Jul. 8, 2021; 8 pages; European Patent Office.
Figueroa, Victor, "Designing a Mechanism to Cleave Silicon Wafers", MIT Thesis, 2004, 28 pages.
Standard Test Method for Measurement of Glass Stress-Optical Coefficient, ASTM standard C770-98, 2013, 8 pages.
Chinese Patent Application No. 202110292166.5, Office Action dated Jul. 18, 2024, 4 pages (English Translation only), Chinese Patent Office.

* cited by examiner

VACUUM CHUCK HAVING ELONGATE GROOVES AND METHOD OF COLD-FORMING CURVED GLASS ARTICLES USING SAME

CROSS-REFERENCE TO RELATED APPLICATIONS

This application claims the benefit of priority under 35 U.S.C. § 119 of U.S. Provisional Application Ser. No. 62/991,193 filed on Mar. 18, 2020, the content of which is relied upon and incorporated herein by reference in its entirety.

BACKGROUND

The disclosure relates to a vacuum chuck and a method of forming a curved glass article using same and, more particularly, to a vacuum chuck having a plurality of elongate groves, connected by a cross conduit, that are configured to hold a glass sheet in a cold-bent configuration.

Vehicle interiors include curved surfaces and can incorporate displays in such curved surfaces. The materials used to form such curved surfaces are typically limited to polymers, which do not exhibit the durability and optical performance as glass. As such, curved glass sheets are desirable, especially when used as covers for displays. Existing methods of forming such curved glass sheets, such as thermal forming, have drawbacks including high cost, optical distortion, and surface marking. Additionally, to meet manufacturing demands, several forming apparatuses are needed for each processing line, and because of the number of forming apparatuses needed, the forming apparatuses are preferably relatively inexpensive to manufacture and use. Accordingly, Applicant has identified a need for vehicle interior systems that can incorporate a curved glass sheet in a cost-effective manner and without problems typically associated with glass thermal forming processes.

SUMMARY

According to an aspect, embodiments of the disclosure relate to a vacuum chuck. The vacuum chuck includes a forming surface having a first longitudinal end, a second longitudinal end, and a curved region. The first longitudinal end and the second longitudinal end define a longitudinal axis, and the curved region defines a radius of curvature along the longitudinal axis. A plurality of elongate grooves are formed into the forming surface in the curved region. Each elongate groove of the plurality of elongate grooves has a length, a width, and a depth extending into the forming surface. The length of each elongate groove is greater than the width. At least one conduit is configured for connection to a vacuum source and is disposed beneath the forming surface. The at least one conduit extends transversely across the plurality of elongate grooves, and the at least one conduit is in fluid communication with the plurality of elongate grooves.

According to another aspect, embodiments of the disclosure relate to a method in which a glass sheet is bent over a forming surface. The glass sheet has a first major surface and a second major surface. The second major surface opposes the first major surface, and the first major surface and the second major surface define a thickness of the glass sheet. The forming surface has a curved region and a plurality of elongate grooves. The curved region defines a first radius of curvature. The second major surface of the glass sheet conforms to the curved region of the forming surface. In the method, a vacuum is drawn through the plurality of elongate grooves to hold the glass sheet against the forming surface.

According to still another aspect, embodiments of the disclosure relate to a vacuum chuck. The vacuum chuck includes a resin body having a forming surface. The forming surface defines a curvature having a first radius of curvature. A plurality of elongate grooves are formed into the forming surface. At least one conduit is formed in the resin body. The plurality of elongate grooves are in fluid communication with the at least one conduit, and the at least one conduit is configured for connection to a vacuum source. A gasket extends around a periphery of the forming surface. The gasket is seated within a channel formed into the forming surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiments of a vacuum chuck and embodiments of cold-forming a curved glass article using same. Exemplary embodiments are illustrated in the accompanying drawings. In general, a vehicle interior system may include a variety of different curved surfaces that are designed to be transparent, such as curved display surfaces and curved non-display glass covers, and the present disclosure provides a vacuum chuck for forming such curved surfaces. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials. Thus, glass is being incorporated into more systems of a vehicle interior. As such, new tools are needed to efficiently, accurately, and inexpensively form curved glass articles for incorporation into the vehicle interior systems.

Accordingly, as will be discussed in more detail below, Applicant has developed a vacuum chuck for cold-forming curved glass articles. In particular, the vacuum chuck includes a plurality of elongate grooves through which a vacuum is drawn to hold a glass sheet in a bent configuration when cold-forming the curved glass article. Advantageously, the elongate grooves provide greater vacuum pressure and is easier to manufacture than conventional vacuum chucks that include vacuum holes in fluid communication with a hollowed-out interior.

Figure 1:
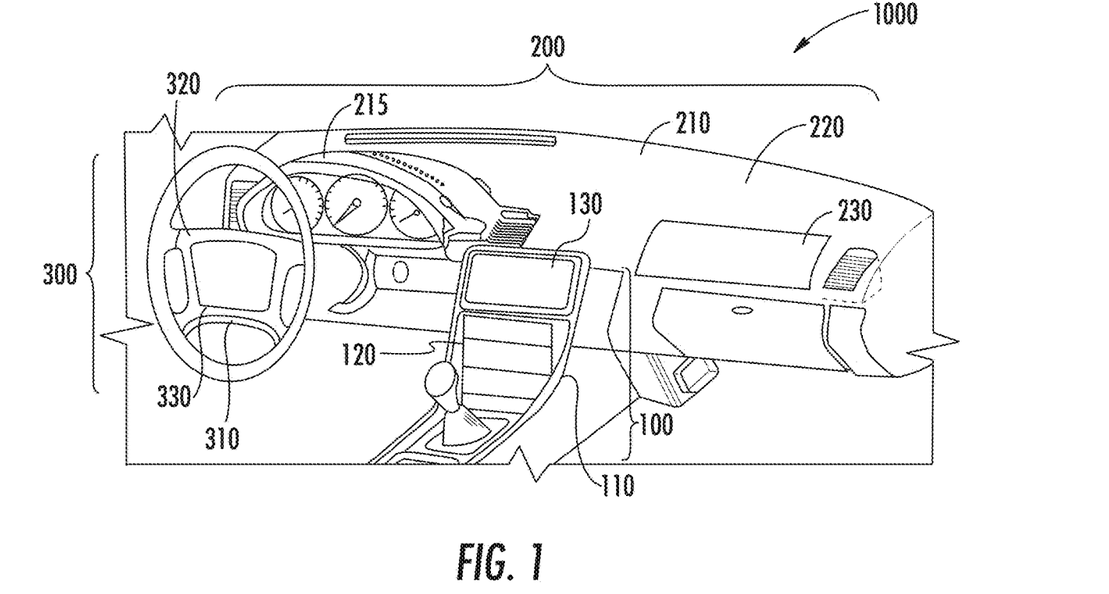
FIG. 1 is a perspective view of a vehicle interior with vehicle interior systems, according to exemplary embodiments.

In order to provide context for the vacuum chuck, exemplary embodiments of curved glass articles that can be formed thereon will be described in relation to the particular application of a vehicle interior system. FIG. 1 shows an exemplary vehicle interior 1000 that includes three different embodiments of a vehicle interior system 100, 200, 300. Vehicle interior system 100 includes a frame, shown as center console base 110, with a curved surface 120 including a curved display 130. Vehicle interior system 200 includes a frame, shown as dashboard base 210, with a curved surface 220 including a curved display 230. The dashboard base 210 typically includes an instrument panel 215 which may also include a curved display. Vehicle interior system 300 includes a frame, shown as steering wheel base 310, with a curved surface 320 and a curved display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle). In embodiments, the display 130, 230, 330 may be at least one of a light-emitting diode display, an organic light-emitting diode display, a quantum dot display, a plasma display, or a liquid crystal display bonded to a rear surface (e.g., using an optically clear adhesive) of a curved glass article 10 disclosed herein. Further, the displays 130, 230, 330 may be provided with touch functionality using a wire resistive sensor, a capacitive sensor, an acoustic wave sensor, an infrared sensor, etc.

The embodiments of the curved glass article described herein can be used in each of vehicle interior systems 100, 200 and 300. Further, the curved glass articles discussed herein may be used as curved cover glasses for any of the curved display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront functionality.

Figure 2:
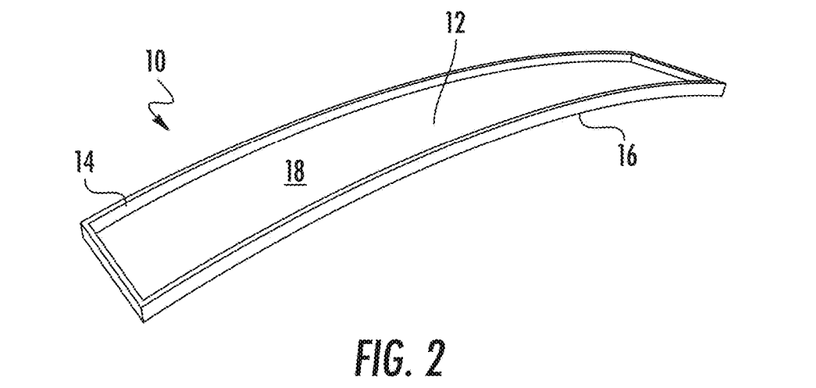
FIG. 2 depicts a curved glass article, according to an exemplary embodiment.

FIG. 2 depicts a curved glass article 10, such as the cover glass for curved display 130, 230, 330 according to exemplary embodiments. It should be understood that, while FIG. 2 is described in terms of forming curved display 130, 230, 330, the curved glass article 10 of FIG. 2 may be used in any suitable curved glass application, including any curved glass component of any of the vehicle interior systems of FIG. 1 or other curved glass surfaces of the vehicle interior 1000. Such curved glass components could be display or non-display regions, e.g., a flat display area and a curved non-display area, curved displays, and curved display and curved non-display areas.

As shown in FIG. 2, the curved glass article 10 includes a glass sheet 12 and a frame 14. The frame 14 holds the glass sheet 12 in a curved configuration. As shown in the side view of FIG. 3, the glass sheet 12 includes a first major surface 16 and a second major surface 18 opposite first major surface 16. A minor surface 20 connects the first major surface 16 and the second major surface 18, and in specific embodiments, minor surface 20 defines the outer perimeter of glass sheet 12. The glass sheet 12 is attached to the frame 14 via an adhesive layer 22.

Figure 3:
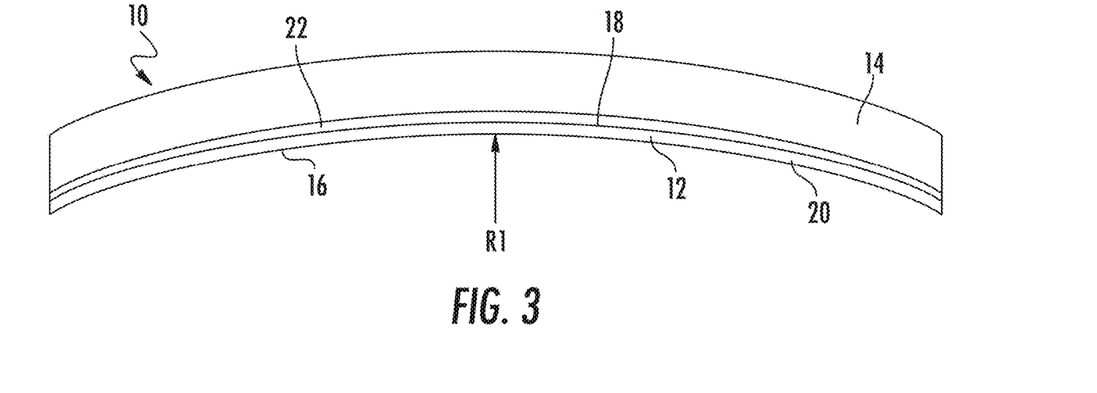
FIG. 3 depicts a side view of the curved glass article of FIG. 2, according to an exemplary embodiment.

The adhesive layer 22 provides long term strength after curing over the course of, e.g., about an hour at ambient temperature. In embodiments, exemplary adhesives for the adhesive layer 22 include toughened epoxy, flexible epoxy, acrylics, silicones, urethanes, polyurethanes, and silane modified polymers.

The glass sheet 12 has a curved shape such that first major surface 16 and second major surface 18 each include at least one curved section having a radius of curvature R1. In embodiments, R1 is between 30 mm and 5 m. Further, in embodiments, the glass sheet 12 has a thickness (e.g., an average thickness measured between surfaces 16, 18) that is in a in range from 0.05 mm to 2 mm. In specific embodiments, the thickness is less than or equal to 1.5 mm and in more specific embodiments, the thickness is 0.4 mm to 1.3 mm. Applicant has found that such thin glass sheets can be cold formed to a variety of curved shapes (including the relatively tight radii of curvature discussed herein) utilizing cold forming without breakage while at the same time providing for a high quality cover layer for a variety of vehicle interior applications. In addition, such thin glass sheets 12 may deform more readily, which could potentially compensate for shape mismatches and gaps that may exist relative to the frame 14.

In various embodiments, first major surface 16 and/or the second major surface 18 of glass sheet 12 includes one or more surface treatments or layers. The surface treatment may cover at least a portion of the first major surface 16 and/or second major surface 18. Exemplary surface treatments include anti-glare surfaces/coatings, anti-reflective surfaces/coatings, and an easy-to-clean surface coating/treatment. In one or more embodiments, at least a portion of the first major surface 16 and/or the second major surface 18 may include any one, any two or all three of an anti-glare surface, an anti-reflective surface, and easy-to-clean coating/treatment. For example, first major surface 16 may include an anti-glare surface and second major surface 18 may include an anti-reflective surface. In another example, first major surface 16 includes an anti-reflective surface and second major surface 18 includes an anti-glare surface. In yet another example, the second major surface 18 comprises either one of or both the anti-glare surface and the anti-reflective surface, and the first major surface 16 includes the easy-to-clean coating. In one or more embodiments, the anti-glare surface includes an etched surface. In one or more embodiments, the anti-reflective surface includes a multi-layer coating.

In embodiments, the glass sheet 12 may also include a pigment design on the first major surface 16 and/or second major surface 18. The pigment design may include any aesthetic design formed from a pigment (e.g., ink, paint and the like) and can include a wood-grain design, a leather design, a brushed metal design, a graphic design, a portrait, or a logo. The pigment design may be printed onto the glass sheet.

Figure 4:
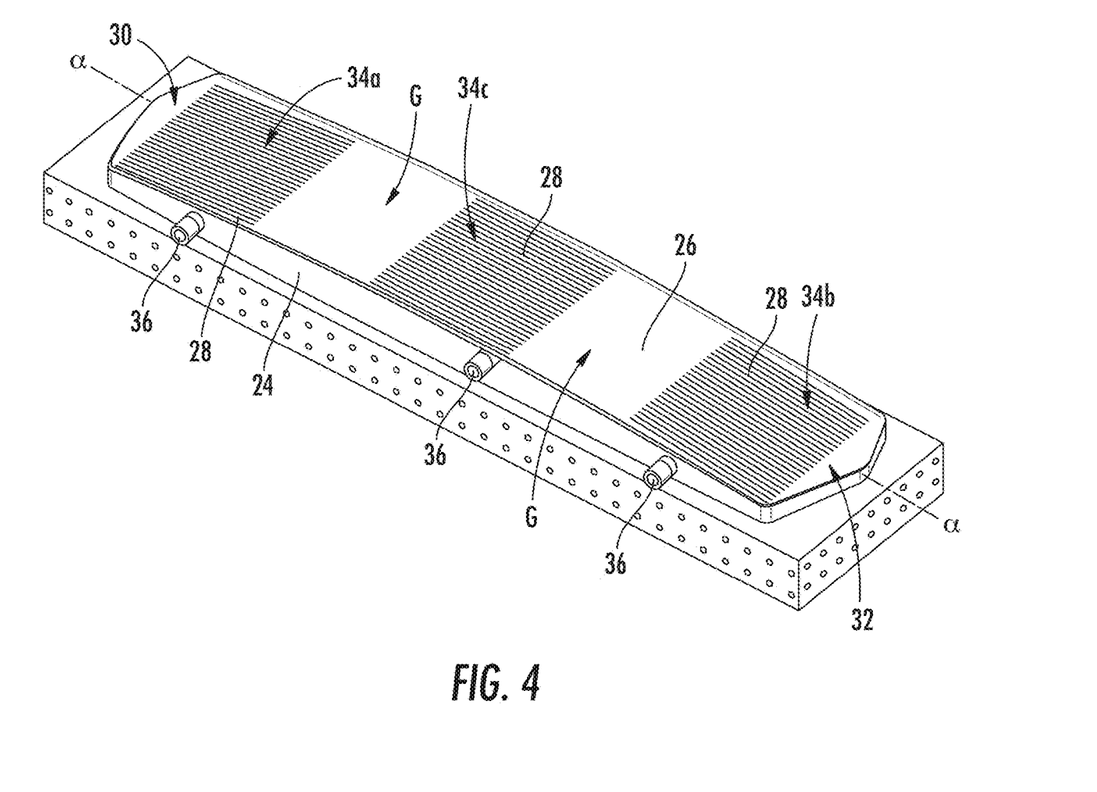
FIG. 4 depicts a vacuum chuck having elongate grooves for cold-forming a curved glass article, according to an exemplary embodiment.

In general, glass sheet 12 is cold formed or cold bent to the desired curved shape via application of a bending force to the glass sheet 12 while it is situated on a vacuum chuck 24, such as shown in FIG. 4. Advantageously, it is easier to apply surface treatments to a flat glass sheet 12 prior to creating the curvature in the glass sheet 12, and cold-forming allows the treated glass sheet 12 to be bent without destroying the surface treatment (as compared to the tendency of high temperatures associated with hot-forming to destroy surface treatments, which requires surface treatments to be applied to the curved article in a more complicated process). In embodiments, the cold forming process is performed at a temperature less than the glass transition temperature of the glass sheet 12. In particular, the cold forming process may be performed at room temperature (e.g., about 20° C.) or a slightly elevated temperature, e.g., at 200° C. or less, 150° C. or less, 100° C. or less, or at 50° C. or less.

The vacuum chuck 24 is used to hold the glass sheet 12 in the cold-bent configuration while a frame 14 is bonded to the glass sheet 12. Upon curing, the frame 14 will permanently keep the glass sheet 12 in the cold-bent configuration. During manufacturing of various automotive systems, multiple vacuum chucks 24 may be needed for each interior system in which the curved glass article 10 is incorporated. In particular, because curing of the adhesive 22 bonding the frame 14 to the glass sheet 12 may take several tens of minutes, manufacturers tend to cold-bend several glass sheets 12 at the same time, requiring multiple vacuum chucks 24 (e.g., twelve to fifteen identical vacuum chucks 24) potentially for each design. The embodiments of the vacuum chuck 24 disclosed herein are intended to decreasing the manufacturing cost and complexity of the vacuum chuck 24 while also enhancing functionality and increasing flexibility of use.

The vacuum chuck 24 includes a forming surface 26 having formed therein one or more sets of elongate grooves 28. The forming surface 26 has a first longitudinal end 30 and a second longitudinal end 32 that define a longitudinal axis α. The forming surface 26 is curved at the radius of curvature R1 along the longitudinal axis α. Further, in embodiments, the elongate grooves 28 extend across the forming surface 26 parallel to the longitudinal axis α. In other embodiments, the elongate grooves 28 are arranged transversely to the longitudinal axis α. The chuck 24 has a length across the curved forming surface 26 between the first longitudinal end 30 and the second longitudinal end 32, and in embodiments, the elongate grooves 28 extend continuously or discontinuously across at least 30% of the length. In other embodiments, the elongate grooves 28 extend continuously or discontinuously across at least 50% of the length. In further embodiments, the elongate grooves 28 extend continuously or discontinuously across at least 75% of the length. In still further embodiments, the elongate grooves 28 extend continuously or discontinuously across at least 90% of the length, and in yet further embodiments, the elongate grooves 28 extend continuously or discontinuously across at least 95% of the length. Further, in embodiments, the elongate grooves 28 can be located within 0.5 mm of the edge of the vacuum chuck 24, e.g., the elongate grooves 28 have a start or end point that is within 0.5 mm of the perimeter of the vacuum chuck.

In the embodiment depicted in FIG. 4, the elongate grooves 28 extend discontinuously along the length so as to define sets of elongate grooves 28. That is, the sets of elongate grooves 28 are separated by a gap G. In embodiments, the gap G is as small as 2 mm. As can be seen in FIG. 4, the gaps G define three sets of elongate grooves 28 with a first set 34a proximal to the first longitudinal end 30, a second set 34b proximal to the second longitudinal end 32, and a third set 34c disposed at an apex of the curvature and centered between the first longitudinal end 30 and the second longitudinal end 32. The elongate grooves 28 of each set 34a-c are connected by a respective conduit 36 through which a vacuum is drawn. Advantageously, having multiple sets 34a-c of elongate grooves 28 allows for vacuum to be drawn sequentially in sections of the forming surface 26. Further, different vacuum pressures can be drawn in different sets 34a-c.

Figure 5:
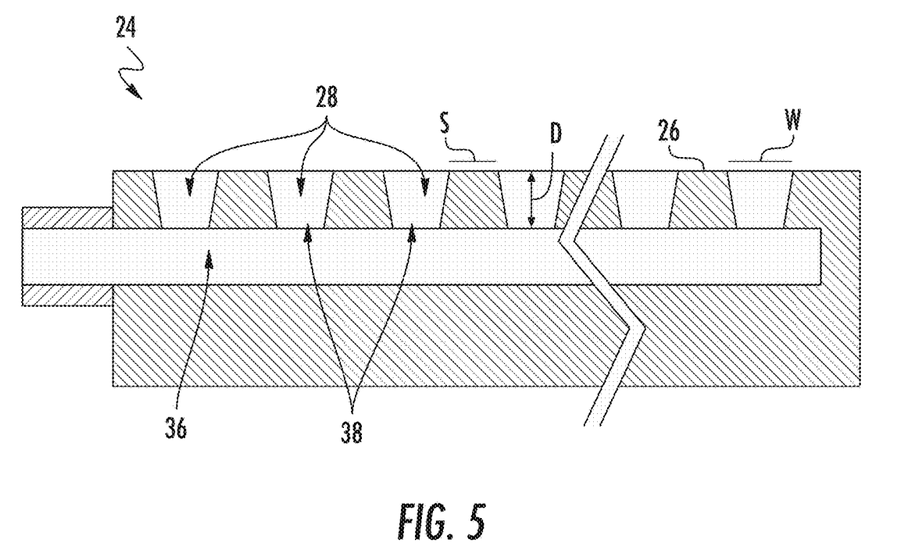
FIG. 5 depicts a cross-sectional view of the vacuum chuck of FIG. 4 taken perpendicular to the longitudinal axis, according to an exemplary embodiment.

FIG. 5 depicts a cross-sectional view of the vacuum chuck 24 taken along a plane perpendicular to the longitudinal axis α. As can be seen, the elongate grooves 28 are formed into the forming surface 26. In embodiments, the elongate grooves 28 have a depth D below the forming surface of from 1 mm to 10 mm. Further, in embodiments, each elongate groove 28 has a width W of from 1 mm to 2 mm, and in embodiments, each elongate groove 28 is spaced apart from an adjacent elongate groove by a spacing S of from 4 mm to 10 mm. Further, in embodiments, the elongate grooves 28 have a length as described above and is also much longer than the width W. In embodiments, the elongate grooves 28 have a length that is at least 10× the width W, and in other embodiments, the length is at least 20× the width W.

The conduit 36 is formed transversely (e.g., perpendicularly) to the substantially parallel elongate grooves 28. For example, in an embodiment, the elongate grooves 28 extend along the length of the forming surface 26 whereas the conduit 36 extends across the width of the forming surface 26. As can be seen in FIG. 5, each elongate groove 28 is in fluid communication with the conduit 36. In particular, at at least one location along each elongate groove 28, a port 38 is formed providing fluid communication between the elongate groove 28 and the conduit 36. In this way, the conduit 36 acts as a plenum for the particular set of elongate grooves 28 in which the conduit 36 is in fluid communication. Thus, in embodiments, each set of elongate grooves 28 is provided with a conduit 36 through which vacuum pressure is drawn.

Figure 6:
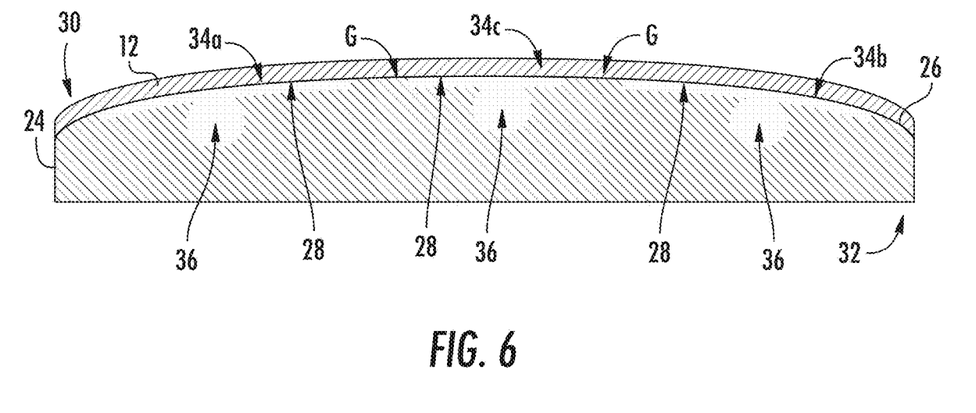
FIG. 6 depicts a cross-sectional view of the vacuum chuck of FIG. 4 with a glass sheet thereon taken parallel to the longitudinal axis, according to an exemplary embodiment.

FIG. 6 depicts another cross-sectional view taken along a plane parallel to the longitudinal axis α. As can be seen, the vacuum chuck 24 has a glass sheet 12 bent over the forming surface 26. After bending the glass sheet 12 over the forming surface, a vacuum is drawn through the elongate grooves 28 and each conduit 36 in order to hold the glass sheet 12 in the cold-bent configuration. Once held in the cold-bent configuration, the frame 14 and/or any displays can be adhered to the exposed surface of the glass sheet 12.

Conventionally, vacuum chucks contained holes drilled in the forming surface, and the interior of the chuck was hollowed out to form a plenum connecting the holes. As compared to the formation of elongate grooves 28 and the conduit 36, fabrication of the vacuum holes and hollowing out of the chuck requires greater manufacturing time. Further, the vacuum pulling force is proportional to the area under the glass sheet through which the vacuum can be drawn. In the conventional vacuum chuck, the vacuum holes cover less than 10% of the area through which vacuum can be drawn. By comparison, the elongate channels 28 allow for vacuum to be drawn over at least 20% of the area under the glass sheet. In other embodiments, the elongate channels 28 allow for vacuum to be drawn over at least 40% of the area under the glass sheet. In embodiments, the elongate channels 28 allow for vacuum to be drawn over up to 60% of the area under the glass sheet. Accordingly, the greater vacuum area provides proportionally greater vacuum pulling force, and less energy is required is required to hold the glass sheet in the cold-bent configuration, especially at tight bend radii.

In embodiments, the vacuum chuck 24 is formed of a metal material. For example, the vacuum chuck 24 can be formed of an aluminum alloy, a steel alloy, a stainless steel alloy, or a magnesium alloy, among others. Conventionally, vacuum chucks made of metal materials took a long time to manufacture because the interior of the vacuum chuck had to be hollowed out, which required removal of a significant amount of material, and several vacuum holes had to be drilled. In contrast, the elongate grooves 28 and conduits 36 can be routed or drilled out in less time than drilling the vacuum holes and hollowing out the plenum of a conventional chuck. Therefore, the presently disclosed vacuum chuck 24 both provides greater vacuum force to hold the glass sheet 12 against the forming surface 26 and is more efficient to manufacture.

In another embodiment, the manufacturing efficiency is further improved by forming the vacuum chuck 24, or at least the forming surface of the vacuum chuck, from a resin material. Exemplary resin materials that can be used to make the vacuum chuck 24 include polyurethanes, epoxies, phenolic resins, polyesters, polyamides, acetal, and engineering plastics (such as polyetherimide, polyetheretherketone, and polyphenylene sulfide), among others. A commercially available resin that can be used for the vacuum chuck 24 is RenShape® (450 or 460 grade; available from Huntsman International LLC, The Woodlands, TX). As compared to conventional materials for forming the vacuum chuck 24 (such as the metals described above), the resin material is quicker to mold and machine, and the resin material is less expensive. Further, the resin material of the vacuum chuck 24 has the additional advantage that it will not damage the glass sheet 12, e.g., by accidentally scratching the glass sheet 12.

Figure 7A:
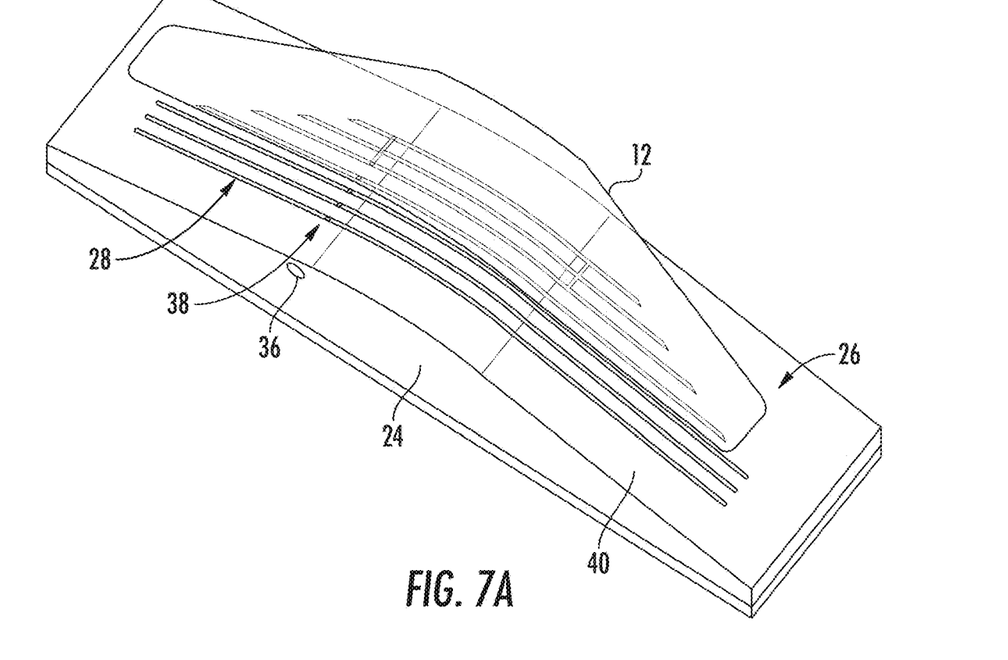
FIGS. 7A-7B depict another embodiment of a vacuum chuck in which the elongate grooves are formed in a tape layer applied over a forming surface of the vacuum chuck, according to an exemplary embodiment.
Figure 7B:
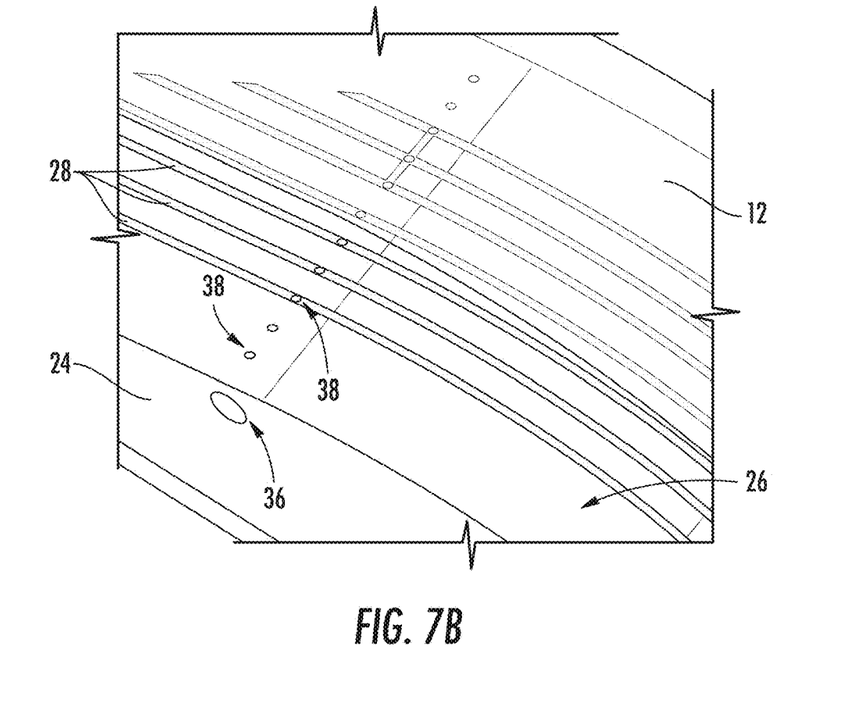

In still another embodiment, the vacuum chuck 24 is made to accommodate a variety of differently sized glass articles 10 that all have the same curvature. In the embodiment depicted in FIGS. 7A and 7B, the vacuum chuck 24 has a larger forming surface 26 than the glass sheet 12 that is cold-bent on the forming surface 26. In this embodiment, the elongate grooves 28 are not cut into the forming surface 26. Instead, as shown in FIG. 7B, the forming surface includes a plurality of vacuum ports 38 in fluid communication with underlying conduits 26. The forming surface 26 is then covered with one or more layers of a film 40. Elongate grooves 28 are cut into the thickness of the film 40 over the plurality of vacuum ports 38. Each elongate groove 28 is cut over at least one vacuum port 38. In this way, the shape, length, and number of elongate grooves 28 can be customized for providing a desired vacuum pressure for individual glass sheets 12.

In embodiments, the film 40 comprises a non-stick tape. Exemplary embodiments of non-stick tape include polyimide tape (e.g., Kapton® Tapes), polyethylene tape, vinyl tape, foam, tape, polyester tape, or PTFE tape, among others. In embodiments, the film 40 may be a polymer film (e.g., an acrylic, polyester, urethane, or vinyl film) that is screen printed or brushed over the forming surface 26. Further, in embodiments, the film 40 has a thickness of at least 50 μm. In embodiments, the film 40 has a thickness of up to 1 mm. Because the elongate grooves 28 are cut into the film 40, the thickness of the layer or layers of film 40 defines the depth of the elongate grooves 28.

As shown in FIG. 7A, the glass sheet 12 has a trapezoidal shape whereas the forming surface 26 of the vacuum chuck 24 has a rectangular perimeter. The length and width of the forming surface are both greater than the length and width of the glass sheet 12. However, the forming surface 26 is adapted for cold-bending of the dissimilarly shaped glass sheet 12 by cutting a plurality of elongate grooves 28 parallel to the length of the forming surface 26 and of the glass sheet 12. As can be seen in FIG. 7A, the elongate grooves 28 taper in length to match the shape of the glass sheet 12.

Figure 8:
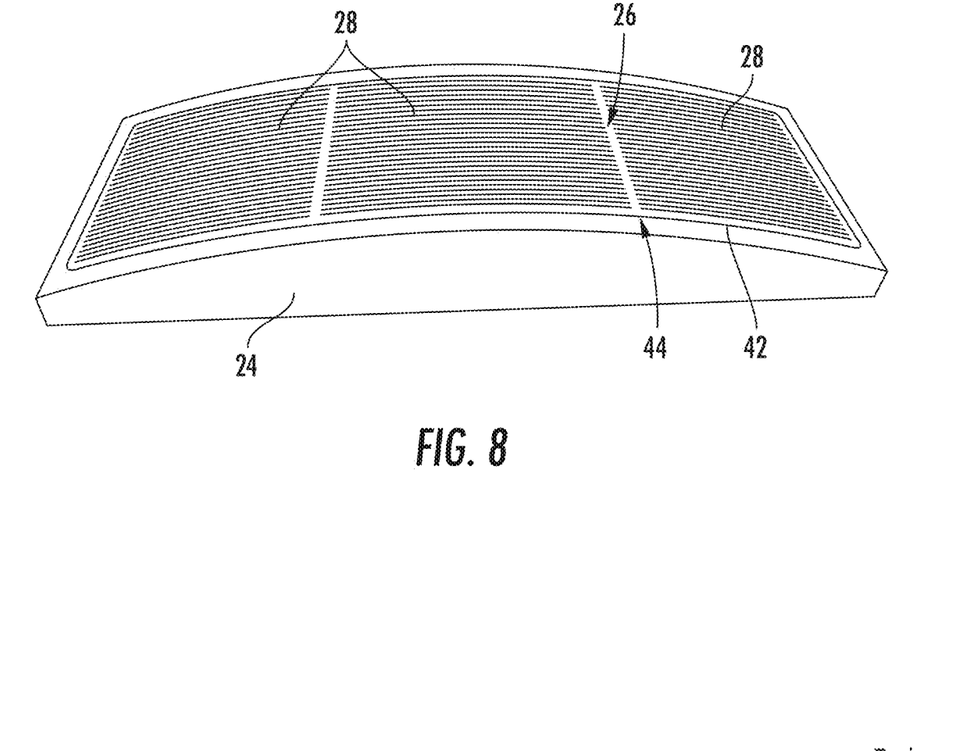
FIG. 8 depicts another embodiment of a vacuum chuck having a peripheral gasket, according to an exemplary embodiment.

FIG. 8 depicts still another embodiment of a vacuum chuck 24 in which a peripheral gasket 42 is provided around the elongate grooves 28. In particular, a peripheral channel 44 is formed into the forming surface 26, and the gasket 42 is seated into the peripheral channel 44. When a glass sheet 12 is bent over the forming surface 26, the glass sheet 12 compresses the gasket 42 until it is flush with the forming surface 26, which creates a peripheral seal between the glass sheet 12 and the forming surface 26. In an embodiment, the gasket 42 is a vacuum gasket cord, such as SmartVac II vacuum gasket (available from Pierson Workholding, Simi Valley, CA).

Figure 9:
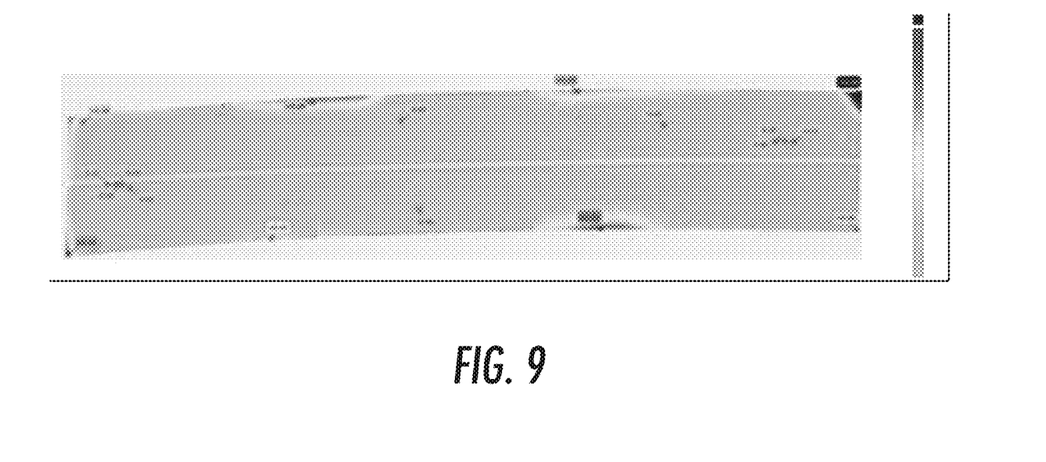
FIG. 9 is a 3D scan depicting the minimal amount of deflection of a glass sheet from a vacuum chuck as disclosed herein during cold-forming, according to an exemplary embodiment.

FIG. 9 depicts a 3D scan of a glass sheet 12 formed on a vacuum chuck 24 having elongate grooves 28 as described herein. The 3D scan demonstrates the liftoff of the glass sheet 12 from the forming surface 26 during cold-forming. As can be seen, the liftoff is minimal over most of the glass sheet 12 with the highest degree of liftoff occurring at the longitudinal ends 30, 32. Notwithstanding, the disclosed vacuum chuck 24 including elongate grooves 28 connected by a conduit 36 prevents liftoff that deviates from the desired curvature of the forming surface 26 by more than 30 μm.

In various embodiments, glass sheet 12 is formed from a strengthened glass sheet (e.g., a thermally strengthened glass material, a chemically strengthened glass sheet, etc.) In such embodiments, when glass sheet 12 is formed from a strengthened glass material, first major surface 16 and second major surface 18 are under compressive stress, and thus second major surface 18 can experience greater tensile stress during bending to the convex shape without risking fracture. This allows for strengthened glass sheet 12 to conform to more tightly curved surfaces.

A feature of a cold-formed glass sheet 12 is an asymmetric surface compressive between the first major surface 16 and the second major surface 18 once the glass sheet 12 has been bent to the curved shape. In such embodiments, prior to the cold-forming process or being cold-formed, the respective compressive stresses in the first major surface 16 and the second major surface 18 of glass sheet 12 are substantially equal. After cold-forming, the compressive stress on concave first major surface 16 increases such that the compressive stress on the first major surface 16 is greater after cold-forming than before cold-forming. In contrast, convex second major surface 18 experiences tensile stresses during bending causing a net decrease in surface compressive stress on the second major surface 18, such that the compressive stress in the second major surface 18 following bending is less than the compressive stress in the second major surface 18 when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass sheets formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, easy-to-clean coating, etc.) are applied via deposition processes, such as sputtering processes that are typically ill-suited for coating curved glass articles. In addition, many surface treatments (e.g., anti-glare coatings, anti-reflective coatings, easy-to-clean coating, etc.) also are not able to survive the high temperatures associated with hot-bending processes. Thus, in particular embodiments discussed herein, one or more surface treatments are applied to the first major surface 16 and/or to the second major surface 18 of glass sheet 12 prior to cold-bending, and the glass sheet 12 including the surface treatment is bent to a curved shape as discussed herein. Thus, Applicant believes that the processes and systems discussed herein allow for bending of glass after one or more coating materials have been applied to the glass, in contrast to typical hot-forming processes.

In various embodiments, a cold-formed glass sheet 12 may have a compound curve including a major radius and a cross curvature. A complexly curved cold-formed glass sheet 12 may have a distinct radius of curvature in two independent directions. According to one or more embodiments, a complexly curved cold-formed glass sheet 12 may thus be characterized as having "cross curvature," where the cold-formed glass sheet 12 is curved along an axis (i.e., a first axis) that is parallel to a given dimension and also curved along an axis (i.e., a second axis) that is perpendicular to the same dimension. The curvature of the cold-formed glass sheet and the curved display can be even more complex when a significant minimum radius is combined with a significant cross curvature, and/or depth of bend. In various embodiments, glass sheet 12 can have more than two curved regions with the same or differing curved shapes. In some embodiments, glass sheet 12 can have one or more region having a curved shape with a variable radius of curvature.

Figure 10:
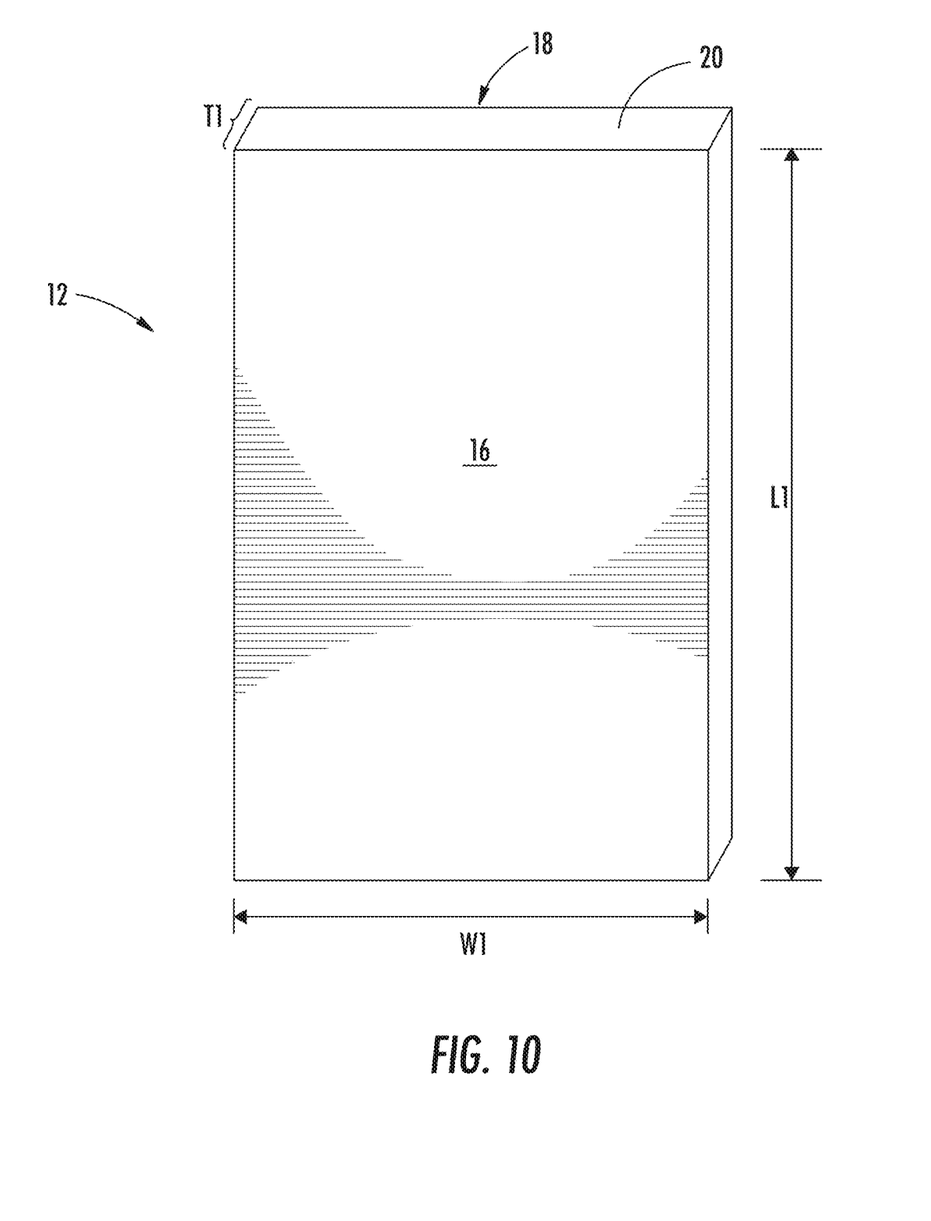
FIG. 10 depicts a glass sheet with exemplary dimensions, according to an exemplary embodiment.

Referring to FIG. 10, additional structural details of glass sheet 12 are shown and described. As noted above, glass sheet 12 has a thickness T1 that is substantially constant and is defined as a distance between the first major surface 16 and the second major surface 18. In various embodiments, T1 may refer to an average thickness or a maximum thickness of the glass sheet. In addition, glass sheet 12 includes a width W1 defined as a first maximum dimension of one of the first or second major surfaces 16, 18 orthogonal to the thickness T1, and a length L1 defined as a second maximum dimension of one of the first or second major surfaces 16, 18 orthogonal to both the thickness and the width. In other embodiments, W1 and L1 may be the average width and the average length of glass sheet 12, respectively.

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R1 shown in FIG. 3) of glass sheet 12 is about 30 mm or greater. For example, R1 may be in a range from about 30 mm to about 5000 mm, from about 50 mm to about 5000 mm, from about 70 mm to about 5000 mm, from about 90 mm to about 5000 mm, from about 110 mm to about 5000 mm, from about 150 mm to about 5000 mm, from about 200 mm to about 5000 mm, from about 250 mm to about 5000 mm, from about 300 mm to about 5000 mm, from about 350 mm to about 5000 mm, from about 400 mm to about 5000 mm, from about 450 mm to about 5000 mm, from about 500 mm to about 5000 mm, from about 550 mm to about 5000 mm, from about 600 mm to about 5000 mm, from about 650 mm to about 5000 mm, from about 700 mm to about 5000 mm, from about 750 mm to about 5000 mm, from about 800 mm to about 5000 mm, from about 850 mm to about 5000 mm, from about 900 mm to about 5000 mm, from about 950 mm to about 5000 mm, from about 1000 mm to about 5000 mm, from about 1500 mm to about 5000 mm, from about 2000 mm to about 5000 mm, from about 2500 mm to about 5000 mm, from about 3000 mm to about 5000 mm, from about 3500 mm to about 5000 mm, from about 4000 mm to about 5000 mm, from about 4500 mm to about 5000 mm, from about 30 mm to about 4500 mm, from about 30 mm to about 4000 mm, from about 30 mm to about 3500 mm, from about 30 mm to about 3000 mm, from about 30 mm to about 2500 mm, from about 30 mm to about 2000 mm, from about 30 mm to about 1500 mm, from about 30 mm to about 1000 mm, from about 30 mm to about 950 mm, from about 30 mm to about 900 mm, from about 30 mm to about 850 mm, from about 30 mm to about 800 mm, from about 30 mm to about 750 mm, from about 30 mm to about 700 mm, from about 30 mm to about 650 mm, from about 30 mm to about 600 mm, from about 30 mm to about 550 mm, from about 30 mm to about 500 mm, from about 30 mm to about 450 mm, or from about 30 mm to about 400 mm. In other embodiments, R1 falls within any one of the exact numerical ranges set forth in this paragraph.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass sheet 12 may be strengthened. In one or more embodiments, glass sheet 12 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 12 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 12 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheet 12*io* may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C. for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T1 of the glass sheet (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass sheet may have a CS (which may be found at the surface or a depth within the glass sheet) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass sheet may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass sheet 12 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %.

In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 12 may be made from any glass composition falling with any one of the exact numerical ranges discussed above.

Aspect (1) of this disclosure pertains to a vacuum chuck, comprising: a forming surface comprising a first longitudinal end, a second longitudinal end, and a curved region, wherein the first longitudinal end and the second longitudinal end define a longitudinal axis, and wherein the curved region defines a radius of curvature along the longitudinal axis; a plurality of elongate grooves formed into the forming surface in the curved region, each elongate groove of the plurality of elongate grooves having a length, a width, and a depth extending into the forming surface, wherein the length of each elongate groove is greater than the width; and at least one conduit configured for connection to a vacuum source, the at least one conduit disposed beneath the forming surface and the at least one conduit extending transversely across the plurality of elongate grooves, wherein the at least one conduit is in fluid communication with the plurality of elongate grooves.

Aspect (2) of this disclosure pertains to the vacuum chuck of Aspect (1), wherein the width of each elongate groove of the plurality of elongate grooves is from 1 mm to 2 mm.

Aspect (3) of this disclosure pertains to the vacuum chuck of Aspect (1) or Aspect (2), wherein the depth of each elongate groove is from 1 mm to 10 mm.

Aspect (4) of this disclosure pertains to the vacuum chuck of any one of Aspects (1) through (3), wherein each elongate groove of the plurality of elongate grooves is spaced apart from an adjacent elongate groove by 4 mm to 10 mm.

Aspect (5) of this disclosure pertains to the vacuum chuck of any one of Aspects (1) through (4), wherein the plurality of elongate grooves cover from 20% to 40% of the forming surface.

Aspect (6) of this disclosure pertains to the vacuum chuck of any one of Aspects (1) through (5), wherein the forming surface comprises a resin material.

Aspect (7) of this disclosure pertains to the vacuum chuck of Aspect (6), wherein the resin material comprises at least one of a polyurethane, an epoxy, a phenolic resin, a polyester, a polyamide, an acetal, a polyetherimide, a polyetheretherketone, or a polyphenylene sulfide.

Aspect (8) of this disclosure pertains to the vacuum chuck of any one of Aspects (1) through (7), wherein the vacuum chuck comprises a resin material.

Aspect (9) of this disclosure pertains to the vacuum chuck of Aspect (8), wherein the resin material comprises at least one of a polyurethane, an epoxy, a phenolic resin, a polyester, a polyamide, an acetal, a polyetherimide, a polyetheretherketone, or a polyphenylene sulfide.

Aspect (10) of this disclosure pertains to the vacuum chuck of any one of Aspects (1) through (5), wherein the forming surface comprises a steel alloy, a stainless steel alloy, an aluminum alloy, or a magnesium alloy.

Aspect (11) of this disclosure pertains to the vacuum chuck of any one of Aspects (1) through (5), wherein the forming surface comprises a film layer, wherein the plurality of elongate grooves are cut into the film layer, and wherein the vacuum chuck comprises a plurality of ports providing fluid communication between the plurality of elongate grooves and the at least one conduit.

Aspect (12) of this disclosure pertains to the vacuum chuck of Aspect (11), wherein the film layer has a thickness of 50 µm to 1 mm.

Aspect (13) of this disclosure pertains to the vacuum chuck of Aspect (11) or Aspect (12), wherein the film layer comprises a polyimide tape, a polyethylene tape, a vinyl tape, a foam tape, a polyester tape, or a PTFE tape.

Aspect (14) of this disclosure pertains to the vacuum chuck of Aspect (11) or Aspect (12), wherein the film layer comprises an acrylic film, a polyester film, a urethane film, or a vinyl film.

Aspect (15) of this disclosure pertains to the vacuum chuck of any one of Aspects (1) through (14), further comprising a channel extending around a perimeter of the forming surface and a gasket disposed within the channel.

Aspect (16) of this disclosure pertains to the vacuum chuck of any one of Aspects (1) through (15), wherein the first set of elongate grooves extends across at least 90% of the curved region.

Aspect (17) of this disclosure pertains to the vacuum chuck of any one of Aspects (1) through (16), wherein the plurality of elongate grooves comprises a first set of elongate grooves and a second set of elongate grooves, wherein the at least one conduit comprises a first conduit in fluid communication with the first set of elongate grooves and a second conduit in fluid communication with the second set of elongate grooves, and wherein a different level of vacuum can be drawn through the first set of elongate grooves than through the second set of elongate grooves.

Aspect (18) of this disclosure pertains to the vacuum chuck of any one of Aspects (1) through (17), wherein the length of each elongate groove extends parallel to the longitudinal axis.

Aspect (19) of this disclosure pertains to a method, comprising bending a glass sheet over a forming surface; wherein the glass sheet comprises a first major surface and a second major surface, wherein the second major surface opposes the first major surface, and wherein the first major surface and the second major surface define a thickness of the glass sheet; wherein the forming surface comprises a curved region and a plurality of elongate grooves, wherein the curved region defines a first radius of curvature; and wherein the second major surface of the glass sheet conforms to the curved region of the forming surface; and drawing a vacuum through the plurality of elongate grooves to hold the glass sheet against the forming surface.

Aspect (20) of this disclosure pertains to the method of Aspect (19), wherein each elongate groove comprises a width of from 1 mm to 2 mm.

Aspect (21) of this disclosure pertains to the method of Aspect (19) or Aspect (20), wherein each elongate groove comprises a depth of from 1 mm to 10 mm.

Aspect (22) of this disclosure pertains to the method of any one of Aspects (19) through (21), wherein each elongate groove within the plurality of elongate grooves is spaced apart from an adjacent elongate groove by 4 mm to 10 mm.

Aspect (23) of this disclosure pertains to the method of any one of Aspects (19) through (22), wherein the forming surface comprises a resin material.

Aspect (24) of this disclosure pertains to the method of Aspect (23), wherein the resin material comprises at least one of a polyurethane, an epoxy, a phenolic resin, a polyester, a polyamide, an acetal, a polyetherimide, a polyetheretherketone, or a polyphenylene sulfide.

Aspect (25) of this disclosure pertains to the method of any one of Aspects (19) through (22), wherein the forming surface comprises a steel alloy, a stainless alloy, an aluminum alloy, or a magnesium alloy.

Aspect (26) of this disclosure pertains to the method of any one of Aspects (19) through (22), wherein the forming surface comprises a polymer film or tape and wherein regions of the polymer film or tape are removed to define the plurality of elongate grooves.

Aspect (27) of this disclosure pertains to the method of Aspect (26), wherein the layer of tape has a thickness of 50 µm to 1 mm.

Aspect (28) of this disclosure pertains to the method of Aspect (26) or Aspect (27), wherein the tape comprises a polyimide tape, a polyethylene tape, a vinyl tape, a foam tape, a polyester tape, or a PTFE tape.

Aspect (29) of this disclosure pertains to the method of Aspect (26) or Aspect (27), wherein the polymer film comprises an acrylic film, a polyester film, a urethane film, or a vinyl film.

Aspect (30) of this disclosure pertains to the method of any one of Aspects (19) through (29), wherein the forming surface further comprises a perimeter channel and wherein the method further comprises seating a gasket in the channel.

Aspect (31) of this disclosure pertains to the method of any one of Aspects (19) through (30), wherein the method further comprises applying an adhesive to the first major surface of the glass sheet after the step of drawing the vacuum.

Aspect (32) of this disclosure pertains to the method of Aspect (31), further comprising the step of attaching a display to the adhesive.

Aspect (33) of this disclosure pertains to the method of Aspect (31) or Aspect (32), further comprising the step of attaching a frame to the adhesive to form a curved glass article.

Aspect (34) of this disclosure pertains to the method of Aspect (33), further comprising the steps of curing the adhesive and removing the curved glass article from the forming surface.

Aspect (35) of this disclosure pertains to a vacuum chuck, comprising: a resin body comprising a forming surface, wherein the forming surface defines a curvature having a first radius of curvature; a plurality of elongate grooves formed into the forming surface; at least one conduit formed in the resin body, wherein the plurality of elongate grooves are in fluid communication with the at least one conduit and wherein the at least one conduit is configured for connection to a vacuum source; and a gasket extending around a periphery of the forming surface, wherein the gasket is seated within a channel formed into the forming surface.

Aspect (36) of this disclosure pertains to the vacuum chuck of Aspect (35), wherein the resin body comprises at least one of a polyurethane, an epoxy, a phenolic resin, a polyester, a polyamide, an acetal, a polyetherimide, a polyetheretherketone, or a polyphenylene sulfide.

Aspect (37) of this disclosure pertains to the vacuum chuck of Aspect (35) or Aspect (36), wherein each elongate groove comprises a width of from 1 mm to 2 mm.

Aspect (38) of this disclosure pertains to the vacuum chuck of any one of Aspects (35) through (37), wherein each elongate groove comprises a depth of from 1 mm to 10 mm.

Aspect (39) of this disclosure pertains to the vacuum chuck of any one of Aspect (35) through (38), wherein each elongate groove within the plurality of elongate grooves is spaced apart from an adjacent elongate groove by 4 mm to 10 mm.

Aspect (40) of this disclosure pertains to the vacuum chuck of any one of Aspects (35) through (39), wherein the plurality of elongate grooves arranged substantially parallel to a longitudinal axis of the resin body.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A vacuum chuck, comprising:
 a forming surface comprising a first longitudinal end, a second longitudinal end, and a curved region, wherein the first longitudinal end and the second longitudinal end define a longitudinal axis, and wherein the curved region defines a radius of curvature along the longitudinal axis, wherein the radius of curvature is from 200 mm to 5000 mm;
 a plurality of elongate grooves formed into the forming surface in the curved region, each elongate groove of the plurality of elongate grooves having a length, a width, and a depth extending into the forming surface, wherein the length of each elongate groove is greater than the width; and
 at least one conduit configured for connection to a vacuum source, the at least one conduit disposed beneath the forming surface and the at least one conduit extending transversely across the plurality of elongate grooves, wherein the at least one conduit is in fluid communication with the plurality of elongate grooves, wherein each elongate groove of the plurality of elongate grooves is spaced apart from an adjacent elongate groove by 4 mm to 10 mm, wherein the plurality of elongate grooves cover from 20% to 40% of the forming surface.

2. The vacuum chuck of claim 1, wherein the width of each elongate groove of the plurality of elongate grooves is from 1 mm to 2 mm.

3. The vacuum chuck of claim 1, wherein the depth of each elongate groove is from 1 mm to 10 mm.

4. The vacuum chuck of claim 1, wherein the forming surface comprises a steel alloy, a stainless steel alloy, an aluminum alloy, a magnesium alloy, or a resin material.

5. The vacuum chuck of claim 1, wherein the vacuum chuck comprises a resin material.

6. The vacuum chuck of claim 1, wherein the forming surface comprises a film layer, wherein the plurality of elongate grooves are cut into the film layer, and wherein the vacuum chuck comprises a plurality of ports providing fluid communication between the plurality of elongate grooves and the at least one conduit.

7. The vacuum chuck of claim 6, wherein the film layer has a thickness of 50 μm to 1 mm.

8. The vacuum chuck of claim 1, further comprising a channel extending around a perimeter of the forming surface and a gasket disposed within the channel.

9. The vacuum chuck of claim 1, wherein the first set of elongate grooves extends across at least 90% of the curved region.

10. The vacuum chuck of claim 1, wherein the plurality of elongate grooves comprises a first set of elongate grooves and a second set of elongate grooves, wherein the at least one conduit comprises a first conduit in fluid communication with the first set of elongate grooves and a second conduit in fluid communication with the second set of elongate grooves, and wherein a different level of vacuum can be drawn through the first set of elongate grooves than through the second set of elongate grooves.

11. The vacuum chuck of claim 1, wherein the length of each elongate groove extends parallel to the longitudinal axis.

12. A method, comprising:
 bending a glass sheet over a forming surface:
  wherein the glass sheet comprises a first major surface and a second major surface, wherein the second major surface opposes the first major surface, and wherein the first major surface and the second major surface define a thickness of the glass sheet;
  wherein the forming surface comprises a curved region and a plurality of elongate grooves, wherein the curved region defines a first radius of curvature, wherein the first radius of curvature is from 200 mm to 5000 mm, wherein each elongate groove of the plurality of elongate grooves is spaced apart from an adjacent elongate groove by 4 mm to 10 mm, wherein the plurality of elongate grooves cover from 20% to 40% of the forming surface; and
  wherein the second major surface of the glass sheet conforms to the curved region of the forming surface; and
 drawing a vacuum through the plurality of elongate grooves to hold the glass sheet against the forming surface.

13. A vacuum chuck, comprising:
- a resin body comprising a forming surface, wherein the forming surface defines a curvature having a first radius of curvature, wherein the first radius of curvature is from 200 mm to 5000 mm;
- a plurality of elongate grooves formed into the forming surface, wherein each elongate groove of the plurality of elongate grooves is spaced apart from an adjacent elongate groove by 4 mm to 10 mm, wherein the plurality of elongate grooves cover from 20% to 40% of the forming surface;
- at least one conduit formed in the resin body, wherein the plurality of elongate grooves are in fluid communication with the at least one conduit and wherein the at least one conduit is configured for connection to a vacuum source; and
- a gasket extending around a periphery of the forming surface, wherein the gasket is seated within a channel formed into the forming surface.

14. The vacuum chuck of claim 13, wherein the resin body comprises at least one of a polyurethane, an epoxy, a phenolic resin, a polyester, a polyamide, an acetal, a polyetherimide, a polyetheretherketone, or a polyphenylene sulfide.

15. The vacuum chuck of claim 13, wherein each elongate groove comprises a width of from 1 mm to 2 mm.

16. The vacuum chuck of claim 13, wherein each elongate groove comprises a depth of from 1 mm to 10 mm.

17. The vacuum chuck of claim 13, wherein the plurality of elongate grooves arranged substantially parallel to a longitudinal axis of the resin body.

\* \* \* \* \*